(12) United States Patent
Leung et al.

(10) Patent No.: US 11,279,378 B1
(45) Date of Patent: *Mar. 22, 2022

(54) SYSTEMS AND METHODS FOR VISUALIZING PREDICTED DRIVING RISK

(71) Applicant: BlueOwl, LLC, San Francisco, CA (US)

(72) Inventors: Theobolt N. Leung, San Francisco, CA (US); Micah Wind Russo, Oakland, CA (US)

(73) Assignee: BLUEOWL, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/990,015

(22) Filed: Aug. 11, 2020

Related U.S. Application Data

(63) Continuation of application No. 16/203,250, filed on Nov. 28, 2018, now Pat. No. 10,940,870.

(51) Int. Cl.
*B60W 50/14* (2020.01)
*B60W 40/09* (2012.01)
*B60W 30/095* (2012.01)
*G06N 5/04* (2006.01)
*B60W 50/00* (2006.01)

(52) U.S. Cl.
CPC .......... *B60W 50/14* (2013.01); *B60W 30/095* (2013.01); *B60W 40/09* (2013.01); *G06N 5/046* (2013.01); *B60W 2050/0035* (2013.01); *B60W 2050/146* (2013.01)

(58) Field of Classification Search
CPC .... B60W 50/14; B60W 30/095; B60W 40/09; B60W 2050/0035; B60W 2050/146; G06N 5/046
See application file for complete search history.

(56) References Cited

U.S. PATENT DOCUMENTS

D568,336 S * 5/2008 Miglietta ..................... D14/492
8,818,834 B1 8/2014 Rastovich et al.
(Continued)

FOREIGN PATENT DOCUMENTS

EP  2848447 A1  3/2015

*Primary Examiner* — Joseph H Feild
*Assistant Examiner* — Rufus C Point
(74) *Attorney, Agent, or Firm* — Faegre Drinker Biddle & Reath LLP

(57) ABSTRACT

Systems and methods of visualizing predicted driving risk are provided herein. Vehicle sensor data associated with a vehicle operator may be analyzed. Based on the analysis of the vehicle sensor data, one or more vehicle operation risks associated with the vehicle operator may be predicted. Each vehicle operation risk may be associated with a portion of a vehicle associated with the vehicle operator. Additionally, each vehicle operation risk may be assigned a priority level, e.g., based on predicted likelihood of occurrence, predicted danger to the vehicle operator, predicted damage to the vehicle, etc. A display overview of the vehicle may be presented to the vehicle operator. In the display overview of the vehicle portions of the vehicle associated with each of the predicted vehicle operation risks may be highlighted. The portions may be highlighted differently (using different colors, heavier/lighter shading, etc.) based on the priority level of their associated risks.

20 Claims, 4 Drawing Sheets

(56) References Cited

U.S. PATENT DOCUMENTS

| | | | |
|---|---|---|---|
| 9,371,004 B2 | 6/2016 | Wehrman et al. | |
| 9,457,809 B2* | 10/2016 | Sasabuchi | B60W 30/0956 |
| 9,886,771 B1 | 2/2018 | Chen et al. | |
| 9,892,573 B1 | 2/2018 | Hsu et al. | |
| 9,900,354 B1 | 2/2018 | Thome et al. | |
| 10,252,729 B1* | 4/2019 | Goldman-Shenhar | B60W 40/09 |
| 10,319,037 B1* | 6/2019 | Chan | G06Q 40/08 |
| 2002/0028987 A1* | 3/2002 | Ziejewski | A61B 5/0002 600/300 |
| 2002/0161533 A1* | 10/2002 | Uegaki | G06Q 99/00 702/35 |
| 2004/0183281 A1* | 9/2004 | Stopczynski | B60R 21/013 280/730.1 |
| 2007/0052973 A1* | 3/2007 | Yamaguchi | B60S 5/00 356/600 |
| 2007/0078601 A1* | 4/2007 | Nakano | B60W 30/16 701/301 |
| 2011/0022267 A1* | 1/2011 | Murphy | B60W 30/04 701/38 |
| 2011/0025848 A1* | 2/2011 | Yumiba et al. | B62D 15/029 348/148 |
| 2012/0072097 A1* | 3/2012 | Ohta | B60R 1/00 701/118 |
| 2014/0203925 A1* | 7/2014 | Augst | B60Q 9/007 340/435 |
| 2014/0257659 A1* | 9/2014 | Dariush | G08G 1/166 701/70 |
| 2015/0064668 A1* | 3/2015 | Manci | G09B 5/00 434/219 |
| 2015/0254581 A1 | 9/2015 | Brahme | |
| 2016/0144787 A1* | 5/2016 | Saward | H04N 7/181 701/29.1 |
| 2016/0198306 A1* | 7/2016 | Miles | G06Q 10/0639 455/456.3 |
| 2016/0347310 A1* | 12/2016 | Moran | G08G 1/16 |
| 2017/0076395 A1* | 3/2017 | Sedlik | G08G 1/096741 |
| 2017/0236340 A1* | 8/2017 | Hagan, Jr. | G07C 5/10 701/31.7 |
| 2017/0236413 A1* | 8/2017 | Takagi | B60W 40/09 701/117 |
| 2017/0352125 A1 | 12/2017 | Dicker et al. | |
| 2018/0025643 A1* | 1/2018 | Yamamoto | B60W 30/09 701/23 |
| 2018/0079359 A1* | 3/2018 | Park | G01S 13/931 |
| 2018/0127001 A1* | 5/2018 | Ricci | G08G 1/096775 |
| 2019/0303718 A1* | 10/2019 | Tanigawa | G06K 9/00805 |

* cited by examiner

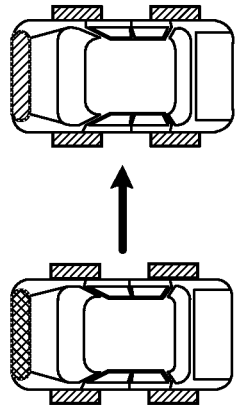
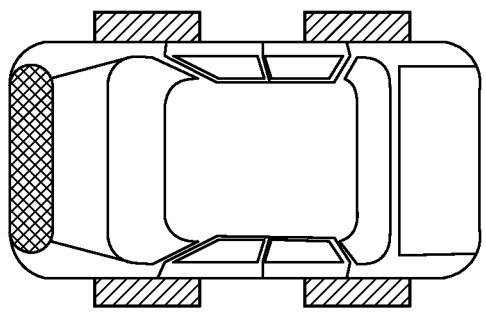
FIG. 2A
FIG. 2B
FIG. 2C

SYSTEMS AND METHODS FOR VISUALIZING PREDICTED DRIVING RISK

CROSS-REFERENCE TO RELATED APPLICATION

The present application is a continuation of U.S. patent application Ser. No. 16/203,250, filed on Nov. 28, 2018, the entire disclosure of which is hereby expressly incorporated herein by reference.

FIELD OF THE DISCLOSURE

The present disclosure generally relates to vehicle safety and, more particularly, to visualizing predicted driving risk.

BACKGROUND

To encourage safer driving, drivers are often presented with information about driving risks, e.g., by an insurance company, or in the context of a driver education class. This driving risk information is typically presented in the form of statistical data. However, the statistical data is typically not personalized for individuals based on their particular risks. Moreover, many individuals may have difficulty fully understanding this statistical data without a visual aid.

SUMMARY

In one aspect, a computer-implemented method of visualizing predicted driving risk is provided. The method comprises: analyzing, by a processor, vehicle sensor data associated with a vehicle operator; predicting, by a processor, based on the vehicle sensor data, one or more vehicle operation risks associated with the vehicle operator, wherein each vehicle operation risk is associated with a portion of a vehicle associated with the vehicle operator; presenting, by a processor, to the vehicle operator, a display overview of the vehicle; and highlighting, by a processor, in the display overview of the vehicle, portions of the vehicle associated with each of the predicted vehicle operation risks.

In another aspect, a computer system for visualizing predicted driving risk is provided. The computer system comprises one or more processors and one or more memories storing instructions. The instructions, when executed by the one or more processors, cause the computer system to: analyze vehicle sensor data associated with a vehicle operator; predict, based on the vehicle sensor data, one or more vehicle operation risks associated with the vehicle operator, wherein each vehicle operation risk is associated with a portion of a vehicle associated with the vehicle operator; present, to the vehicle operator, a display overview of the vehicle; and highlight, in the display overview of the vehicle, portions of the vehicle associated with each of the predicted vehicle operation risks.

In still another aspect, a computer-readable storage medium having stored thereon a set of instructions for visualizing predicted driving risk is provided. The instructions are executable by a processor, and comprise instructions for: analyzing vehicle sensor data associated with a vehicle operator; predicting, based on the vehicle sensor data, one or more vehicle operation risks associated with the vehicle operator, wherein each vehicle operation risk is associated with a portion of a vehicle associated with the vehicle operator; presenting, to the vehicle operator, a display overview of the vehicle; and highlighting, in the display overview of the vehicle, portions of the vehicle associated with each of the predicted vehicle operation risks.

BRIEF DESCRIPTION OF THE DRAWINGS

FIGS. 2A-2C illustrate several exemplary user interface displays, in accordance with some embodiments.

DETAILED DESCRIPTION

To encourage safer driving, drivers are often presented with information about driving risks, e.g., by an insurance company, or in the context of a driver education class. This driving risk information is typically presented in the form of statistical data. However, the statistical data is typically not personalized for individuals based on their particular risks. Moreover, many individuals may have difficulty fully understanding this statistical data without a visual aid.

Systems and methods for visualizing predicted driving risk are provided herein. A mobile device application may be configured to analyze vehicle telematics data associated with a user in order to identify and/or predict risks associated with the user's driving. The risks may be identified and/or predicted based on the user's driving trends/patterns over time. The identified and/or predicted risks may be highly personalized to the user. The risks may be graphically displayed visually on a user interface and displayed to the user. In some instances, the visual display may include a "heat map" over parts of the vehicle that are subject to risks. In some instances, the application may additionally include suggestions for decreasing risks. The suggestions may be incorporated into the visual display. For example, a suggestion of decreasing speed may include an image predicting how the heat map could change with decreased speed (e.g., certain areas could be shown as less red or more green).

Specifically, vehicle sensor data associated with a vehicle operator may be analyzed, and, based on the analysis of the vehicle sensor data, one or more vehicle operation risks associated with the vehicle operator may be predicted. Each vehicle operation risk may be associated with a portion of a vehicle associated with the vehicle operator. Additionally, each vehicle operation risk may be assigned a priority level, e.g., based on predicted likelihood of occurrence, predicted danger to the vehicle operator, predicted damage to the vehicle, etc. A display overview of the vehicle may be presented to the vehicle operator. In the display overview of the vehicle portions of the vehicle associated with each of the predicted vehicle operation risks may be highlighted. The portions may be highlighted differently (using different colors, heavier/lighter shading, etc.) based on the priority level of their associated risks.

Figure 1A:
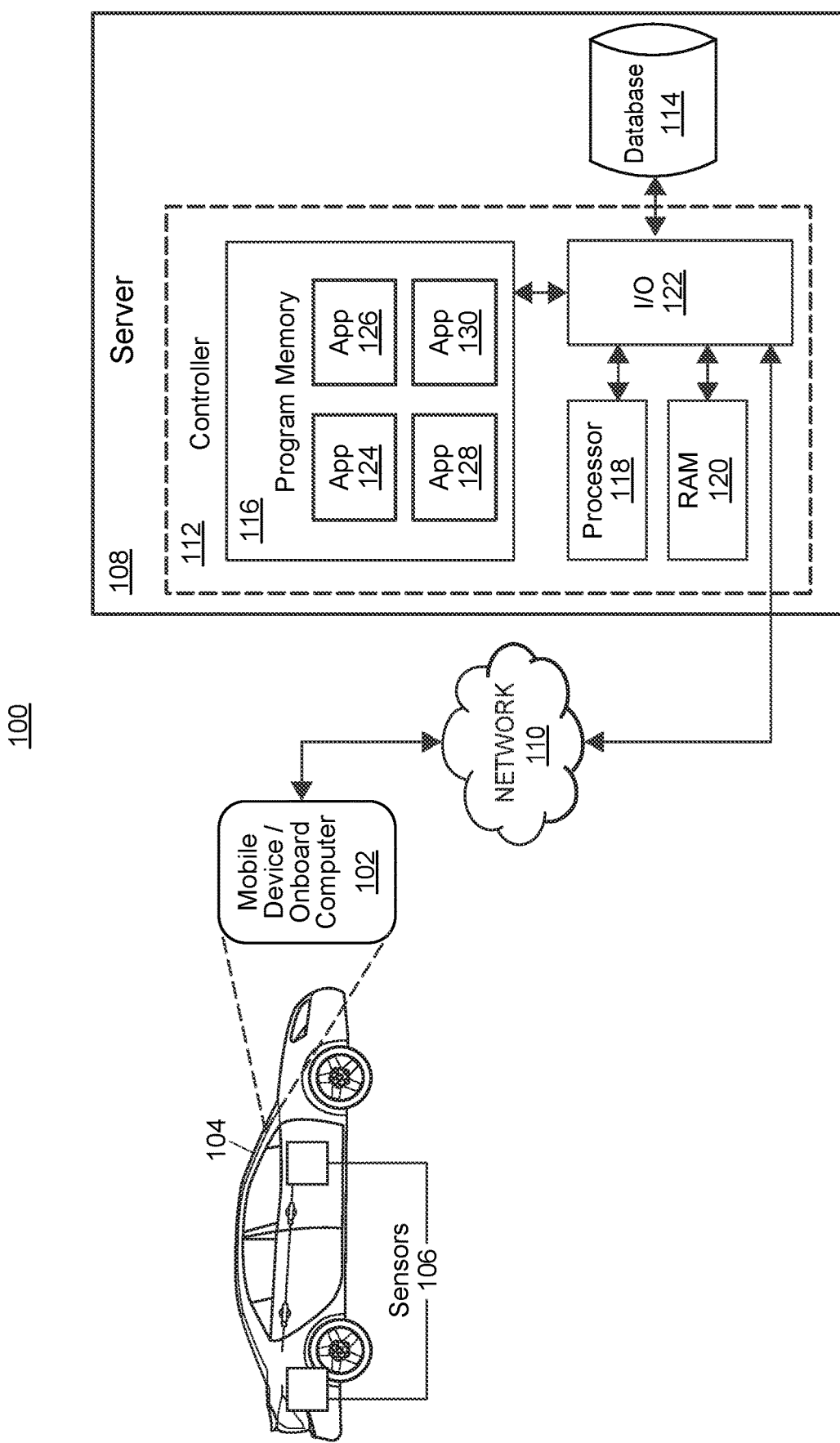
FIG. 1A illustrates an exemplary computer system for visualizing predicted driving risk, in accordance with some embodiments.

Referring now to FIG. 1A, an exemplary computer system 100 for visualizing predicted driving risk is illustrated, in accordance with some embodiments. The high-level architecture illustrated in FIG. 1A may include both hardware and software applications, as well as various data communications channels for communicating data between the various hardware and software components, as is described below.

As shown in FIG. 1A, a mobile device and/or on-board computer 102 (shown in greater detail at FIG. 1B) associated with a vehicle 104 (which may be, e.g., a car, a truck, a boat, a motorcycle, a motorized scooter, or any other vehicle) may interface with sensors 106, which may capture vehicle telematics data and other suitable data associated with the vehicle. The mobile device and/or on-board computer 102 may be configured to communicate the captured sensor data to a server 108 via a network 110. By analyzing this captured sensor data, the server 108 may predict one or more vehicle operation risks associated with the vehicle operator. Furthermore, the server 108 may generate a display overview of the vehicle, generate a highlighting scheme indicating portions of the vehicle associated with each of the predicted vehicle operation risks, and transmit the generated display overview of the vehicle to the mobile device and/or onboard computer 102 for presentation to a vehicle operator (not shown) associated with the vehicle 106. In some examples, the server 108 may further identify steps and/or other guidance for reducing the predicted vehicle operation risks and transmit identified steps to the mobile device and/or onboard computer 102 for presentation to the vehicle operator. Moreover, the server 108 may generate a second display overview of the vehicle, and may generate a highlighting scheme for highlighting portions of the vehicle associated with vehicle operation risks predicted to be reduced based on the steps for reducing the predicted vehicle operation risks, and transmit this second display overview and highlighting scheme to the mobile device and/or onboard computer 102 for presentation to the vehicle operator.

As shown in FIG. 1A, the server 108 may include a controller 112 that may be operatively connected to the one or more databases 114 via a link, which may be a local or a remote link. The one or more databases 114 may be adapted to store data related to, for instance, vehicle operation risks associated with various sensor data trends, priority levels of various vehicle operation risks, portions of a vehicle affected by various vehicle operation risks, various display overviews for different types of vehicles, various highlighting schemes for highlighting portions of a vehicle associated with different vehicle operation risks, various steps for reducing various types of vehicle operation risks, etc. It should be noted that, while not shown, additional databases may be linked to the controller 112. Additionally, separate databases may be used for various types of information, in some instances. Additional databases (not shown) may be communicatively connected to the server 108 via the network 110.

The controller 112 may include one or more program memories 116, one or more processors 118 (which may be, e.g., microcontrollers and/or microprocessors), one or more random-access memories (RAMs) 120, and an input/output (I/O) circuit 122, all of which may be interconnected via an address/data bus. Although the I/O circuit 122 is shown as a single block, it should be appreciated that the I/O circuit 122 may include a number of different types of I/O circuits. The program memory 116 and RAM 120 may be implemented as semiconductor memories, magnetically readable memories, optically readable memories, or biologically readable memories, for example. Generally speaking, the program memory 116 and/or the RAM 120 may respectively include one or more non-transitory, computer-readable storage media. The controller 112 may also be operatively connected to the network 110 via a link.

The server 108 may further include a number of various software applications 124, 126, 128, 130 stored in the program memory 116. Generally speaking, the applications may perform one or more functions related to, inter alia, analyzing vehicle sensor data, predicting vehicle operation risks associated with a vehicle operator, generating a display overview of the vehicle, generating a highlighting scheme indicating portions of the vehicle associated with each of the predicted vehicle operation risks, identifying steps and/or other guidance for reducing the predicted vehicle operation risks, generating a second display overview of the vehicle, generating a highlighting scheme for highlighting portions of the second display overview of the vehicle associated with vehicle operation risks predicted to be reduced based on the steps for reducing the predicted vehicle operation risks, transmitting various data to the mobile device and/or onboard computer 102 for presentation to the vehicle operator, etc. For example, one or more of the applications 124, 126, 128, 130 may perform at least a portion of any of the method 300 shown in FIG. 3. The various software applications 124, 126, 128, 130 may be executed on the same processor 126 or on different processors. Although four software applications 124, 126, 128, 130 are shown in FIG. 1A, it will be understood that there may be any number of software applications 124, 126, 128, 130. Further, two or more of the various applications 124, 126, 128, 130 may be integrated as an integral application, if desired.

It should be appreciated that although the server 108 is illustrated as a single device in FIG. 1A, one or more portions of the server 108 may be implemented as one or more storage devices that are physically co-located with the server 108, or as one or more storage devices utilizing different storage locations as a shared database structure (e.g. cloud storage). In some embodiments, the server 108 may be configured to perform any suitable portion of the processing functions remotely that have been outsourced by the on-board computer and/or mobile device 102.

Figure 1B:
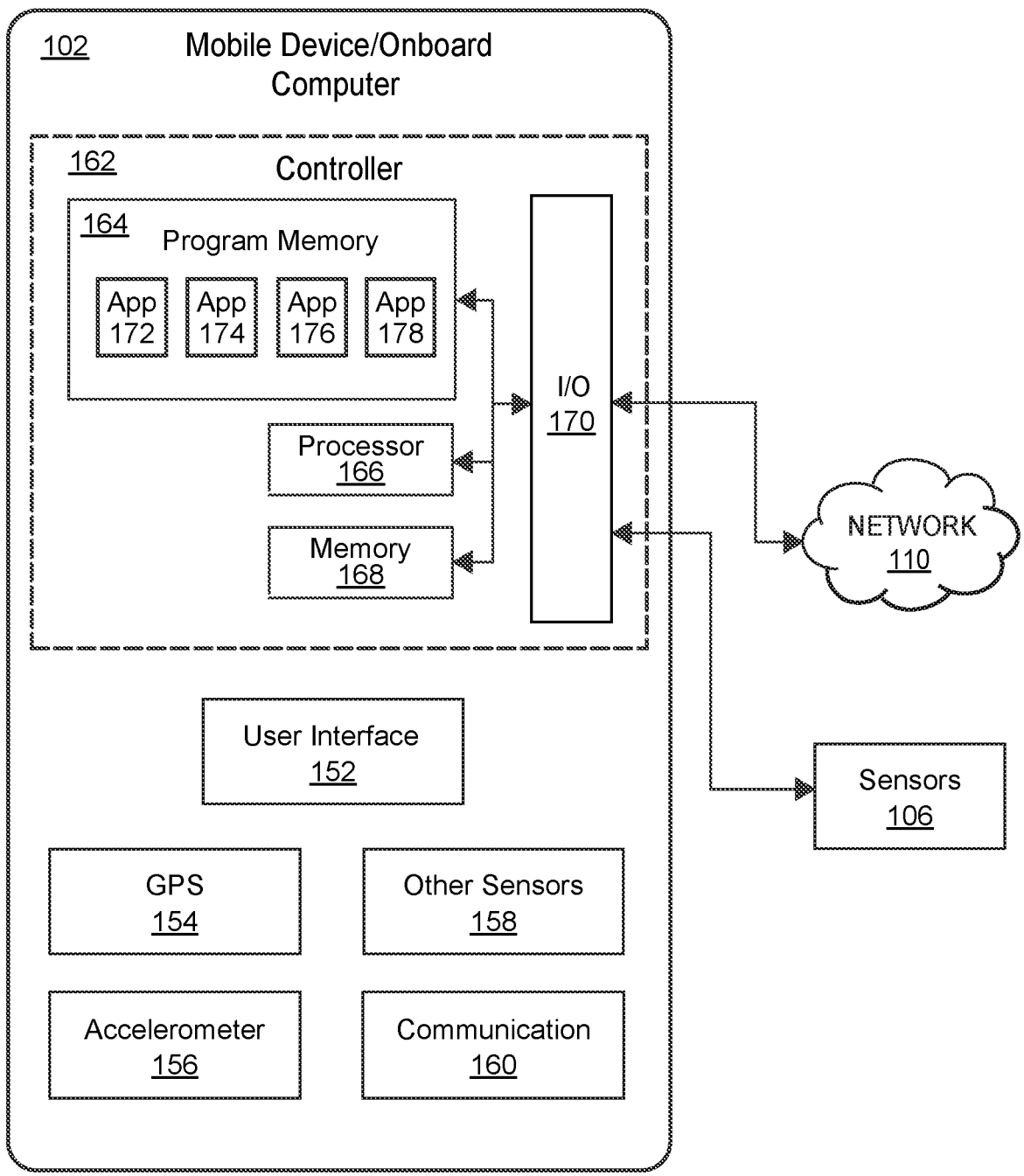
FIG. 1B illustrates an exemplary mobile device and/or onboard computer operable within the system of FIG. 1A, in accordance with some embodiments.

Referring now to FIG. 1B, an exemplary mobile device and/or onboard computer operable within the system of FIG. 1A is illustrated, in accordance with some embodiments. The mobile device and/or onboard computer 102 may include one or more of a user interface 152, GPS unit 154, an accelerometer 156, one or more other sensors 158, a communication unit 160, and/or a controller 162.

The user interface 152 may be disposed at the mobile device and/or onboard computer 102 and may display or present information to the vehicle operator. For instance, user interface may present a display overview of a vehicle (e.g., as shown in FIG. 2A), vehicle operation guidance (e.g., as shown in FIG. 2B), a second display overview of the vehicle illustrating projected changes in vehicle operation risks if the vehicle operator follows the presented guidance (e.g., as shown in FIG. 2C), etc. In some instances, the user interface 152 may receive information and/or selections from the vehicle operator, such as, e.g., selections of various portions of the vehicle display overview, or selections of various guidance. In response to such user selections, the user interface may, for instance, provide additional details, or may modify the highlighting of the vehicle display overview.

The GPS unit 154 may be disposed at the mobile device and/or onboard computer 102 and may collect data indicating the location of the mobile device and/or onboard computer 102, and/or (e.g., by proxy) the vehicle 104. Moreover, in some embodiments the GPS unit 140 may be a separate device disposed within or external to the vehicle 104 (e.g., one of the sensors 106), and interfacing with the mobile device and/or onboard computer 102. The accelerometer 156 may be disposed at the mobile device and/or onboard computer 102 and may collect data indicating the acceleration of the mobile device and/or onboard computer 102 and/or (e.g., by proxy) the vehicle 104. Moreover, in some embodiments the GPS unit 156 may be a separate device disposed within or external to the vehicle 104 (e.g., one of the sensors 106), and interfacing with the mobile device and/or onboard computer 102. In general, the GPS unit 154, an accelerometer 156, one or more other sensors 158, and the sensors 106 may be configured to capture vehicle telematics data associated with the vehicle 104, e.g., one or more of speed data, acceleration data, braking data, cornering data, object range distance data (e.g., following distance data), turn signal data, seatbelt use data, location data, phone use data, date/time data, weather data, road type data, or any other suitable vehicle telematics data. The communication unit 160 may be disposed at the mobile device and/or onboard computer 102 and may, e.g., transmit and receive information from external sources such as, e.g., the server 108, e.g., via the network 110.

As shown in FIG. 1B, the mobile device and/or onboard computer 102 may include a controller 162, which may include one or more program memories 164, one or more processors 166 (which may be, e.g., microcontrollers and/or microprocessors), one or more memories (which may be, e.g., random-access memories (RAMs)) 168, and an input/output (I/O) circuit 170, all of which may be interconnected via an address/data bus. Although the I/O circuit 170 is shown as a single block, it should be appreciated that the I/O circuit 170 may include a number of different types of I/O circuits. The program memory 164 and RAM 168 may be implemented as semiconductor memories, magnetically readable memories, optically readable memories, or biologically readable memories, for example. Generally speaking, the program memory 164 and/or the RAM 168 may respectively include one or more non-transitory, computer-readable storage media. The controller 162 may also be operatively connected to the network 110 via a link.

The mobile device and/or onboard computer 102 may further include a number of various software applications 172, 174, 176, 178 stored in the program memory 164. Generally speaking, the applications may perform one or more functions related to, inter alia, receiving various data from the server 108, presenting a display overview of a vehicle (e.g., as shown in FIG. 2A) to the vehicle operator, presenting vehicle operation guidance (e.g., as shown in FIG. 2B) to the vehicle operator, presenting a second display overview of the vehicle illustrating projected changes in vehicle operation risks if the vehicle operator follows the presented guidance (e.g., as shown in FIG. 2C), receiving information and/or selections from the vehicle operator, etc. For example, one or more of the applications 172, 174, 176, 178 may perform at least a portion of any of the method 300 shown in FIG. 3. The various software applications 172, 174, 176, 178 may be executed on the same processor 166 or on different processors. Although four software applications 172, 174, 176, 178 are shown in FIG. 1B, it will be understood that there may be any number of software applications 172, 174, 176, 178. Further, two or more of the various applications 172, 174, 176, 178 may be integrated as an integral application, if desired. Additionally, it should be appreciated that in some embodiments, the mobile device and/or onboard computer 102 may be configured to perform any suitable portion of the processing functions described as being performed by the server 108.

Turning now to FIGS. 2A, 2B, and 2C, several exemplary user interface displays for visualizing predicted driving risk are illustrated, in accordance with some embodiments. For example, the exemplary user interface displays shown in FIGS. 2A, 2B, and/or 2C may be displayed via the user interface 152. As shown in FIG. 2A, a display overview of a vehicle may be presented to a vehicle operator. FIG. 2A illustrates an example of portions of the display overview of the vehicle that may be highlighted. As shown in FIG. 2A, the front bumper is highlighted with a darker shading, while the tires are highlighted with a lighter shading. For example, the front bumper shading, compared to the tire shading, may indicate that there is a higher risk or a higher priority risk associated with front bumper damage based on the vehicle operator's predicted vehicle operation risks. For instance, there may be a 50% risk of front bumper damage, and a 25% risk of tire damage.

As shown in FIG. 2B, vehicle operation guidance may be presented to the vehicle operator, e.g., based on identified steps for reducing the one or more predicted vehicle operation risks. The display shown in FIG. 2B indicates to the vehicle operator that increasing his or her following distance and slowing down his or her cornering may reduce the vehicle operator's predicted vehicle operation risks. As shown in FIG. 2C, a second display overview of the vehicle may be presented to the vehicle operator, e.g., alongside the first display overview of the vehicle. The second display overview of the vehicle may illustrate a projected change in vehicle operation risks if the vehicle operator follows the presented guidance. That is, as shown in FIG. 2C, the guidance indicates that the vehicle operator's risk of front bumper damage will decrease by 25% if he or she increases his or her following distance by one car length. Accordingly, the second display overview of the vehicle highlights the front bumper with the same lighter shading as the tires, indicating the vehicle operator's risk of front bumper damage will decrease to 25%. In various embodiments, the vehicle operator may have the option to view various display overviews highlighting projected changes in vehicle operation risk based on other potential changes (e.g., based on slower cornering).

Figure 3:
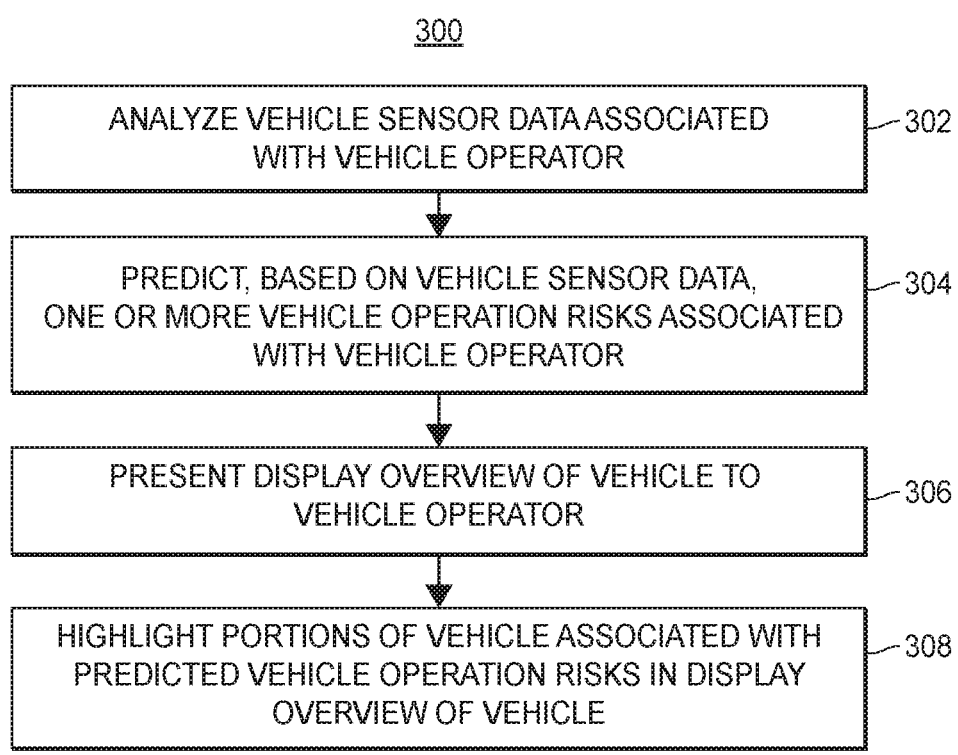
FIG. 3 illustrates a flow diagram of an exemplary computer-implemented method of visualizing predicted driving risk, in accordance with some embodiments.

Turning now to FIG. 3, a flow diagram of an exemplary computer-implemented method 300 of visualizing predicted driving risk is illustrated, in accordance with some embodiments. The method 300 can be implemented as a set of instructions stored on a computer-readable memory and executable on one or more processors.

Vehicle sensor data associated with a vehicle operator may be analyzed (block 302). The vehicle sensor data associated with the vehicle operator may include, e.g., speed data, acceleration data, braking data, cornering data, object range distance data (e.g., following distance data), turn signal data, seatbelt use data, location data, phone use data, weather data, road type data, data/time data, and/or any other suitable vehicle sensor data. For instance, this vehicle sensor data may be analyzed to identify trends and/or patterns in the operation of the vehicle. For example, a trend and/or pattern of the vehicle operator frequently or consistently (e.g., every day, every week, on several consecutive trips, etc.) driving above the speed limit may be identified. As another example, a trend and/or pattern of the vehicle operator frequently "hard" cornering or "hard" braking may be identified. As still another example, a trend and/or pattern of close following distance may be identified. Of course, any suitable trend and/or pattern in the vehicle sensor data may be identified.

Based on the analysis of the vehicle sensor data, one or more vehicle operation risks associated with the vehicle operator may be predicted (block 304). These vehicle operation risks may predicted based on the vehicle operator's driving trends/patterns over time. Accordingly, the predicted vehicle operation risks may be highly personalized to the vehicle operator. For example, based on a trend of the vehicle operator frequently or consistently exceeding the speed limit, a risk of crashing the vehicle may be predicted. In particular, each vehicle operation risk may be associated with a portion of the vehicle. For example, based on a trend of frequent hard cornering or hard acceleration, a risk of tire damage may be predicted. Accordingly, the risk of tire damage may be associated with the tires of the vehicle. As another example, based on a trend of a frequent short following distance, a risk of damaging the front bumper in a crash may be predicted. Accordingly, the risk of damaging the front bumper may be associated with the front bumper of the vehicle. As still another example, based on a trend of frequently driving close to the center line, a risk of damaging the driver's side door may be predicted. Accordingly, the risk of damaging the driver's side door may be associated with the driver's side door.

Additionally, each vehicle operation risk may be assigned a priority level based on, e.g., the predicted likelihood of occurrence, the predicted danger to the vehicle operator, the predicted damage to the vehicle, etc. For instance, if a predicted likelihood of occurrence of tire damage is greater than a predicted likelihood of damaging the driver's side door (e.g., based on the identified trends), the risk of tire damage may be assigned a higher priority level than the risk of damaging the driver's side door. As another example, if damaging the front bumper of the vehicle is likely to be more dangerous to the vehicle operator than damaging the driver's side door, the risk of damaging the front bumper of the vehicle may be assigned a higher priority than the risk of damaging the driver's side door. As still another example, if crashing the vehicle is likely to cause greater damage to the vehicle than wearing down the tires, the risk of crashing the vehicle may be assigned a higher priority level than the risk of wearing down the tires.

A display overview of the vehicle may be presented (block 306) to the vehicle operator (e.g., as shown in FIG. 2A). The display overview of the vehicle may be, e.g., a schematic view of the vehicle. The display overview of the vehicle may generally represent various parts of the vehicle, but may not include every part, and may not necessarily be drawn to scale. Portions of the vehicle that are associated with predicted vehicle operation risks may be highlighted (block 308) in the display overview of vehicle. In some examples, portions of the vehicle that are associated with different predicted vehicle operation risks may be highlighted differently, e.g., based on a priority level of the predicted vehicle operation risk associated with the portion of the vehicle. For example, portions of the vehicle associated with higher priority risks may be highlighted in one color, while portions of the vehicle associated with lower priority risks may be highlighted in another color. For instance, the visual display may include a "heat map" over portions of the vehicle that are subject to various vehicle operational risks. For example, lower-risk portions of the vehicle may be highlighted in green, while higher risk portions of the vehicle may be highlighted in red.

For example, for a vehicle operator whose vehicle sensor data indicates consistent driving close to the center line, the driver's side of the vehicle may be highlighted in red, indicating that a predicted increased likelihood of a crash on that side of the vehicle based on the vehicle operator's driving habits. As another example, for a vehicle operator whose vehicle sensor data indicates frequent hard braking, the brakes may be highlighted in red, indicating a predicted increased likelihood of wearing out the brakes. As still another example, for a vehicle operator whose vehicle sensor data indicates frequent hard cornering, tires may be highlighted in red, indicating a predicted increased likelihood of wearing out the tires.

In some examples, the method 300 additionally includes identifying steps for reducing the predicted vehicle operation risks. In particular, vehicle operation guidance may be presented to the vehicle operator (e.g., as shown in FIG. 2B) based on the identified steps for reducing the predicted vehicle operation risks. In some examples, a second display overview of the vehicle may be presented to the vehicle operator (e.g., alongside the first display overview of the vehicle, as shown in FIG. 2C). Portions of the second display overview of the vehicle may be highlighted based on risks that may be reduced based on the presented guidance. For example, if the presented guidance indicates that the vehicle operator may reduce vehicle operation risks by increasing his or her following distance, portions of the vehicle where risks may decrease may be highlighted in lighter red, or in green.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, and other types of insurance from the insurance provider.

In one aspect, data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method for visualizing driving risks, the method comprising:
   analyzing, by one or more processors, sensor data from a vehicle to determine one or more driving behaviors of a vehicle operator;
   determining, by one or more processors, a plurality of vehicle operation risks based upon the one or more driving behaviors of the vehicle operator, each risk of the plurality of vehicle operation risks being associated with a risk of damage to a particular portion of the vehicle;
   presenting, by one or more processors, a first graphical representation of the vehicle to the vehicle operator; and
   highlighting, by one or more processors, in the first graphical representation of the vehicle, vehicle parts on the vehicle corresponding to the particular portion of the vehicle associated with each risk of the plurality of vehicle operation risks.

2. The computer-implemented method of claim 1, wherein the sensor data include one or more of: speed data, acceleration data, braking data, cornering data, object range distance data, turn signal data, seatbelt use data, location data, phone use data, weather data, and/or road type data.

3. The computer-implemented method of claim 1, wherein each risk of the plurality of vehicle operation risks is assigned a priority level based upon one or more of: (i) predicted likelihood of occurrence; (ii) predicted danger to the vehicle operator; and/or (iii) predicted damage to the vehicle.

4. The computer-implemented method of claim 3, wherein highlighting the particular portion of the vehicle associated with each risk of the plurality of vehicle operation risks further comprises:
   highlighting each portion of the vehicle differently based upon the priority level of each risk of the plurality of vehicle operation risks.

5. The computer-implemented method of claim 4, wherein highlighting each portion of the vehicle differently based upon the priority level of each risk of the plurality of vehicle operation risks further comprises:
   highlighting portions of the vehicle associated with higher priority risks in a first color; and
   highlighting portions of the vehicle associated with lower priority risks in a second color.

6. The computer-implemented method of claim 1, further comprising:
   identifying, by one or more processors, one or more steps for reducing the plurality of vehicle operation risks; and
   presenting, by one or more processors, a vehicle operation guidance based upon the one or more steps for reducing the plurality of vehicle operation risks.

7. The computer-implemented method of claim 6, further comprising:

presenting, by one or more processors, a second graphical representation of the vehicle to the vehicle operator; and
highlighting, by one or more processors, in the second graphical representation of the vehicle, the vehicle parts on the vehicle corresponding to portions of the vehicle associated with the plurality of vehicle operation risks to be reduced based upon the vehicle operation guidance.

8. A system for visualizing driving risks, the system comprising:
   one or more processors; and
   one or more memories storing instructions that, when executed by the one or more processors, cause the one or more processors to:
      analyze sensor data from a vehicle to determine one or more driving behaviors of a vehicle operator;
      determine a plurality of vehicle operation risks based upon the one or more driving behaviors of the vehicle operator, each risk of the plurality of vehicle operations risks being associated with a risk of damage to a particular portion of the vehicle;
      present a first graphical representation of the vehicle to the vehicle operator; and
      highlight, in the first graphical representation of the vehicle, vehicle parts on the vehicle corresponding to the particular portion of the vehicle associated with each risk of the plurality of vehicle operation risks.

9. The system of claim 8, wherein the sensor data include one or more of: speed data, acceleration data, braking data, cornering data, object range distance data, turn signal data, seatbelt use data, location data, phone use data, weather data, and/or road type data.

10. The system of claim 8, wherein each risk of the plurality of vehicle operation risks is assigned a priority level based upon one or more of: (i) predicted likelihood of occurrence; (ii) predicted danger to the vehicle operator; and/or (iii) predicted damage to the vehicle.

11. The system of claim 10, wherein the instructions that cause the one or more processors to highlight the particular portion of the vehicle associated with each risk of the plurality of vehicle operation risks further cause the one or more processors to:
   highlight each portion of the vehicle differently based upon the priority level of each risk of the plurality of vehicle operation risks.

12. The system of claim 11, wherein the instructions that cause the one or more processors to highlight each portion of the vehicle differently based upon the priority level of each risk of the plurality of vehicle operation risks further cause the one or more processors to:
   highlight portions of the vehicle associated with higher priority risks in a first color; and
   highlight portions of the vehicle associated with lower priority risks in a second color.

13. The system of claim 8, wherein the instructions, when executed by the one or more processors, further cause the one or more processors to:
   identify one or more steps for reducing the plurality of vehicle operation risks; and
   present, a vehicle operation guidance based upon the one or more steps for reducing the plurality of vehicle operation risks.

14. The system of claim 13, wherein the instructions, when executed by the one or more processors, further cause the one or more processors to:

present, a second graphical presentation of the vehicle to the vehicle operator; and highlight, in the second graphical presentation of the vehicle, the vehicle parts on the vehicle corresponding to portions of the vehicle associated with the plurality of vehicle operation risks to be reduced based upon the vehicle operation guidance.

15. A non-transitory computer-readable storage medium having stored thereon a set of instructions for visualizing driving risks, executable by a processor, the set of instructions comprising instructions for:

analyzing sensor data from a vehicle to determine one or more driving behaviors of a vehicle operator;

determining a plurality of vehicle operation risks based upon the one or more driving behaviors of the vehicle operator, each risk of the plurality of vehicle operation risks being associated with a risk of damage to a particular portion of the vehicle;

presenting a first graphical representation of the vehicle to the vehicle operator; and highlighting, in the first graphical representation of the vehicle, vehicle parts on the vehicle corresponding to the particular portion of the vehicle associated with each risk of the plurality of vehicle operation risks.

16. The non-transitory computer-readable storage medium of claim 15, wherein each risk of the plurality of vehicle operation risks is assigned a priority level based upon one or more of: (i) predicted likelihood of occurrence; (ii) predicted danger to the vehicle operator; and/or (iii) predicted damage to the vehicle.

17. The non-transitory computer-readable storage medium of claim 16, wherein the instructions for highlighting the particular portion of the vehicle associated with each risk of the plurality of vehicle operation risks further comprise instructions for:

highlighting each portion of the vehicle differently based upon the priority level of each risk of the plurality of vehicle operation risks.

18. The non-transitory computer-readable storage medium of claim 17, wherein the instructions for highlighting each portion of the vehicle differently based upon the priority level of each risk of the plurality of vehicle operation risks further comprise instructions for:

highlighting portions of the vehicle associated with higher priority risks in a first color; and highlighting portions of the vehicle associated with lower priority risks in a second color.

19. The non-transitory computer-readable storage medium of claim 15, further comprising instructions for:

identifying one or steps for reducing the plurality of vehicle operation risks; and presenting a vehicle operation guidance based upon the one or more steps for reducing the plurality of vehicle operation risks.

20. The non-transitory computer-readable storage medium of claim 19, further comprising instructions for:

presenting a second graphical presentation of the vehicle to the vehicle operator; and highlighting, in the second graphical representation of the vehicle, the vehicle parts on the vehicle corresponding to portions of the vehicle associated with the plurality of vehicle operation risks to be reduced based upon the vehicle operation guidance.

\* \* \* \* \*